Figure 1:
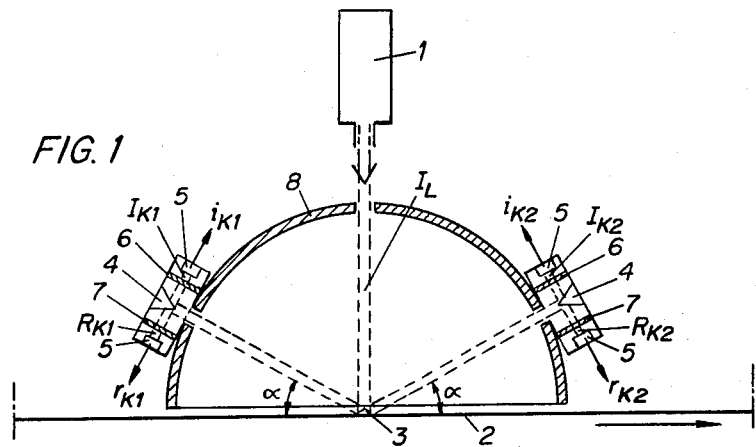

United States Patent
Simila

[11] 3,807,868
[45] Apr. 30, 1974

[54] METHOD FOR DETERMINING THE FIBRE ORIENTATION IN PAPER OR EQUIVALENT BY THE AID OF LIGHT REFLECTED BY THE PAPER

[75] Inventor: Pauli Simila, Keuruu, Finland
[73] Assignee: Valmet Oy, Helsinki, Finland
[22] Filed: Mar. 21, 1972
[21] Appl. No.: 236,705

[52] U.S. Cl. ............... 356/118, 356/212, 356/222, 356/237, 250/219 WE, 250/225, 73/159
[51] Int. Cl. ........................................ G01n 21/40
[58] Field of Search .......... 356/118, 120, 209, 212, 356/222, 237; 250/219 WE, 225; 73/159

[56] References Cited
UNITED STATES PATENTS
| | | | |
|---|---|---|---|
| 3,435,241 | 3/1969 | Hickey et al. | 73/159 X |
| 3,349,665 | 10/1967 | Grosheim et al. | 356/118 |
| 3,274,882 | 9/1966 | Krieger et al. | 250/225 X |
| 3,060,793 | 10/1962 | Wells | 356/118 |
| 2,406,166 | 8/1946 | Scott | 356/212 |

Primary Examiner—Ronald L. Wibert
Assistant Examiner—Paul K. Godwin
Attorney, Agent, or Firm—V. Alexander Shur

[57] ABSTRACT

A method for determining the fibre orientation of a product made of fibres comprises the steps of directing a polarized light beam at right angles to the plane of the paper constituting the product, reflecting the intensity of light in two planes at right angles to each other, forming from the intensity of relfected light two quantities, one of which is produced by passing the reflected light through a polarizer the plane of which is parallel to the plane of polarization of the light beam, while the other quantity is produced by passing the reflected light through a polarizer the plane of which is perpendicular to the plane of polarization of the light beam, forming differences of these quantities in both planes and using the ratio and/or difference of these differences as an index value for the anistrophy of fibre orientation.

7 Claims, 3 Drawing Figures

PATENTED APR 30 1974 3,807,868

METHOD FOR DETERMINING THE FIBRE ORIENTATION IN PAPER OR EQUIVALENT BY THE AID OF LIGHT REFLECTED BY THE PAPER

The present invention concerns a method by which it is possible to determine the fibre orientation of paper or of an equivalent product composed of fibres by measuring light reflected by the paper, which light is derived from a light source the light of which has a high intensity and is substantially monochromatic, most appropriately laser light.

Fibre orientation is understood to mean that the fibres of the paper or equivalent are not uniformly arranged in all directions in the plane of the product but that certain directions are in the majority. Fibre orientation is frequently the most decisive factor in the strength anisotropy of paper. This is particularly true for sack or bag paper, since in these endeavours are made in connection with their manufacturing to eliminate the drying stresses which otherwise significantly influence the strength anisotropy, whereby the significance of fibre orientation in the generation of strength anisotropy even further increases.

In the following some of the factors exerting effects on the formation of fibre orientation in a paper machine are presented in catalogue fashion: When the pulp emerges from the headbox, orientation is caused in the first place by the shaping of the lip portion and by the position of the upper lip and lower lip with reference to each other. When the pulp is deposited on the endless wire, orientation is caused by the differential velocity between the pulp jet and the wire, and this is also commonly used to alter the orientation. Orientation is also produced by the rate of dewatering and by vibration of the wire. The fibre length has also been found in certain cases to have significance with regard to the formation of orientation.

Especially in the case of sack papers and cardboards the clarification of their fibre orientation is important, because in sack papers it is known to correlate with the tensile strength relations, and in the case of cardboard it is well-known that increase of its fibre orientation impairs the dimensional stability and the bulk.

Several methods for determining the fibre orientation are known in prior art. Of these the various kinds of tensile strength tests may be mentioned, in which the tensile strengths in different directions of the paper are measured. Usable results are only obtained by these methods if a high correlation exists between tensile strength and orientation, and this is not always the case. Next, the staining method may be mentioned, wherein stained fibres are added to the pulp and the fibres lying in different directions are individually counted. This method is cumbersome, and it is difficult to examine commercial brands.

Various methods for determination of fibre orientation based on diffraction have also been presented, such as X-ray and neutron diffraction methods, but these have not yet been adequately studied and their ultimate usefulness has not been elicited. A difficulty occurring in principle is that of interpreting the diffraction patterns obtained. Ultrasonic methods have also been employed; an example is the method according to the Finnish Pat. No. 42 482, which is based on producing deflection waves in the paper. Of the advantages of this method the possibility of measurements on line shall be mentioned and of its drawbacks, the difficulties encountered when thin paper brands are measured. In the U.S. Pat. No. 2,509,068 a polarimetric method has been disclosed, but no applications of this method have been seen.

Orientation measuring methods employing laser light are also known in prior art, such as the method of Sjolin and Rudstrom (Svensk Papperstidn. 5, 1970), which is based on diffraction, too. The difficulties in this method are imposed by thickness of the paper and by its inapplicability to measurements on line. In another method laser light has been applied to the study of orientation in condenser paper in that very thin paper is traversed by a polarized laser beam, the paper being placed in a rotatable holder, and photographs made of the small scale scattering pattern thus obtained are studied, subsequently measuring them by photometry. It has been possible by this method to determine the orientation in condenser paper. The drawbacks of this method are its slowness and inapplicability to use on line, and its usability with thin papers only.

The starting point for the present invention was the need to develop a reliable fibre orientation measuring method suitable for use on line, by which it would be possible to map more accurately than before the correlations between the factors considered above, and others, and the fibre orientation and which method might later be adapted to serve the automatic control of paper machines. In its simple form, the method is also well appropriate for use in laboratory measurements.

The method according to the invention is mainly characterized in that a polarized light beam, most appropriately a laser beam, is directed at right angles against the plane of the paper; the intensity of the light reflected by the paper under a given angle is observed in two planes at right angles to each other so that from the intensity of the reflected light two quantities are formed, of which one has been obtained by conducting the reflected light to pass through a polarizer having a polarizing plane parallel to the plane of polarization of the light beam, while the other quantity has been obtained by conducting the reflected light to pass through a polarizer with its polarizing plane perpendicular to the plane of polarization of the light beam, and the differences of the quantities observed in both planes are formed, the ratio and/or difference of these differences being used as a measure of the fibre orientation anisotropy in the object of measurement.

Figure 2:
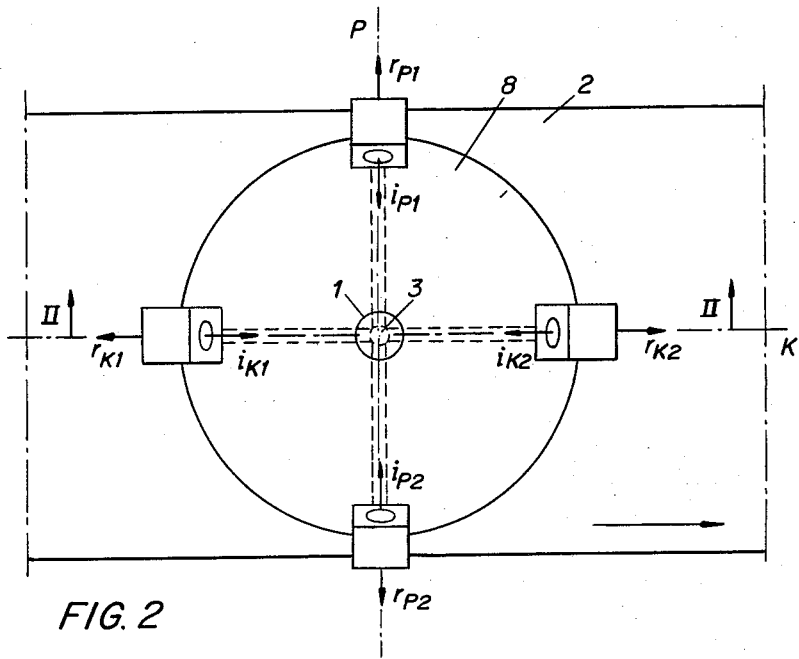
Figure 3:
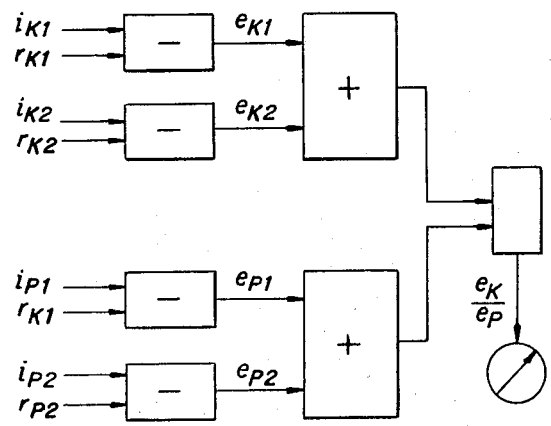

The invention, and the advantages over methods of prior art which are gained by its aid, are described in detail with reference to the figures in the attached drawing, wherein FIG. 1 presents the principle of a measuring device applying a method according to the invention, in elevational view, and FIG. 1 simultaneously being a section along the line II—II in FIG. 2. FIG. 2 shows the measuring device, viewed from above. FIG. 3 shows a block diagram presentation of the logics for the processing of the quantities measured.

The basis of the method according to the invention consists of the reflection of light in accordance with the laws of refraction. If one imagines a light beam striking an idealized fibre having an oblong cylindrical mantle surface, at right angles to its longitudinal axis, then reflections will occur exclusively in directions straight sidewardly from the fibre, and none will occur in the longitudinal direction. Imagine, now, a completely oriented "paper" composed of such idealized fibres, in which all fibres lie in the same direction, e.g., in the machine direction. Then, when the paper is illuminated at right angles, powerful reflection is obtained in the transverse vertical plane and in the plane in the machine direction no reflection at all is seen in lateral direction. Paper is never as unambiguous as this, and the fibres are not even always parallel to the surface of the paper, but in spite of this a rather reliable measure is obtained for the fibre orientation by a method having the above idealization for its starting point.

Referring now to FIG. 1, the paper 2 is illuminated by a polarized light beam from the light source 1, most properly a laser, which laser beam is denoted with $I_L$, and which beam has been broadened by means of a telescope to have a diameter of e.g., about 1.5 cm. The light beam $I_L$ strikes the paper 2 to be studied, such as the moving web in a paper machine, at the point 3, where reflection in all directions occurs. The means observing the reflected light have to be placed in two mutually perpendicular planes P and K, which are both perpendicular on the plane of the paper 2 and intersect at the point 3 where the light beam $I_L$ impinges. It has been found that the highest resolution is obtained by the method if the intensity of the light reflected under an angle ($\alpha$) about 45° is measured.

Of the reflected light, the intensity of which is measured, part is such light which has been reflected by the fibres in accordance with the above principle straight to one side, but part of it consists of light which has penetrated more deeply into the paper and has been reflected several times, and at the same time its plane of polarization has changed so as to become arbitrarily distributed. These different components are separated by using polarizers 6 and 7, whereby in the first place that light can be separated which originates from fibres in the surface layer and which has retained its original plane of polarization. To this purpose, the reflected light is divided into two components with substantially equal intensities by the aid of a beam divider, such as an angular mirror 4. The first component is directed to pass through a polarizer 6 having a polarizing plane parallel to the original plane of polarization of the light beam $I_L$. The beam component thus obtained has been denoted with $I_K$ and $I_P$, and in the ombodiment example shown in the figures two values of $I_K$ and $I_P$ each are observed, namely, $I_{K1}$, $I_{K2}$ and $I_{P1}$, $I_{P2}$. However, these components include such a reflected light component the plane of polarization of which has not remained as it was originally but which is unpolarized so that its planes of polarization are substantially equally distributed in all directions. In order to obtain a sample of this component, the other component obtained with the beam divider 4 is conducted to pass through a polarizer 7 having a plane of polarization perpendicular to that of the light beam $I_L$. The beam component thus obtained has been denoted with $R_K$ and $R_P$ and, correspondingly, the values $R_{K1}$, $R_{K2}$ and $R_{P1}$, $R_{P2}$ are observed.

The beam components considered in the foregoing, $I_K$, $I_P$ and $R_K$, $R_P$, are all conducted into detectors 5, as which for instance pyro- electric, photoelectric or other equivalent detectors serve. From these detectors electrical signals are obtained which are proportional to the intensity of the incident beam component, and these have been denoted, correspondingly, with $i_K$, $i_P$ and $r_K$, $r_P$. Since for the reasons mentioned above the beam component I also includes R, it is necessary to form a quantity proportional to their difference I − R, in order that the true component reflected from the surface of the paper might be found. This is accomplished by conducting the mutually corresponding signals $i_{K1}$, $r_{K1}$, etc. into difference forming means (FIG. 3), from which their differences $i_{K1} - r_{K1}$, etc. are obtained, these having been denoted with $e_{K1,2}$ and $e_{P1,2}$. Since the same differences, in principle, have been measured twice, the means of the differences $e_{K1}$ and $e_{K2}$ and of the differences $e_{P1}$ and $e_{P2}$ are formed, by the use of which one may eliminate e.g., the effects of crinkling of the paper. It is obviously possible to make only one measurement each of $e_K$ and $e_P$. The next step is to form the ratio $e_K/e_P$ of the differences $e_K$ and $e_P$ or of their means, which ratio is conducted to an indicating instrument, such as a pointer instrument or a recorder and which ratio is used as a measure for the fibre orientation of the paper 2. It is thought to be possible, in certain instances, also to use the difference $e_K - e_P$ as a corresponding measure. When the said ratio $e_K/e_P$ equals 1, the paper may be assumed to be completely unoriented, and when the ratio increases, this implies increasing orientation, in the machine direction in this case.

In the method a polarized light source 1 is employed, the light beam $I_L$ emitted by which has a high intensity and is substantially monochromatic. Laser light is particularly suitable to be used because it is then easy to obtain a sufficiently strong intensity also in the reflections, whereby the influence of interference factors is reduced, that is the signal/noise ratio is increased. Furthermore, laser light is in itself monochromatic and also coherent. The use of laser light facilitates the construction of the optical system, and the choice of detectors imposes no difficulties. As regards the mechanical and electronic realization of a device according to the method, one conceivable embodiment example is a construction wherein the beam dividers 4 and detectors 5 have been mounted on a hemispherical bowl 8, which has openings at appropriate points for the laser beam $I_L$, or a mounting point for its optics, and apertures for the beam components reflected by the paper constituting the object of measurement. The bowl 8 may be mounted over a moving paper web, and it protects against external disturbing factors, such as extraneous light, dust, and from mechanical damage. As regards the electronics of the device, FIG. 3 merely shows the principle of the logic circuits processing the measured data. The requisite electronic unit may be realized in a manner previously known in itself by using difference forming means, adding means, amplifiers and filtering circuits, which remove from the measuring signal all high frequencies up to a given upper limit frequency, if necessary. In its simple form the electronic unit is an analog unit, but it may also be realized as a digital unit.

By the method and with the device described above a number of tests have been carried out, in which with sack papers a distinct, unambiguous correlation was established between tensile strength relations and the result of measurement obtained by the method. This is one argument furnishing evidence that the quantity determined by the method indeed represents the fibre orientation, since it is known that in sack paper the fibre orientation is a decisive factor in the generation of strength anisotropy.

In the foregoing one embodiment of the invention has been described, which is suitable for use in measurements on line in the paper machine. However, the scope of the invention also includes a simpler embodiment, which has its uses in the first place in laboratory measurements of fibre orientation. A laboratory measuring device applying the method may be realized, for instance, by mounting the paper sample to be studied in a holder under a light source corresponding to the light source 1. The detector for the reflected light consists, most simply, of a detector corresponding to the detector 5 and of one single polarizer placed in front of it, the polarizing plane of which can be changed through an angle of 90°. This entire detector unit is mounted at an appropriate angle ($\alpha$) with reference to the paper sample, and the detector and sample have been arranged to be rotatable about an axis which is parallel to the light beam $I_L$. With the aid of this measuring device the measurements are carried out by turning the paper sample or detector about their respective axis in order to find those points where the maximum and minimum reflections are obtained from the paper under examination, and these maximum and minimum points usually lie in planes substantially perpendicular to each other. The intensity values I of the reflections at the maximum and minimum points are observed with the detector, with the polarizing plane of the polarizer parallel to the plane of polarization of the light beam $I_L$. Next, the polarizing plane of the polarizer is turned through 90 degrees and the intensity values R are correspondingly observed at the maximum and minimum points, whereupon the differences $I - R$ of the intensity values I and R at the maximum and minimum points are calculated, and from their ratio and/or difference the measured value of the fibre orientation of the paper sample is obtained.

I claim:

1. Method for determining the fibre orientation of a fibre product by measuring light reflected by the fibre porduct, which light is derived from a light source emitting light of high intensity and which is substantially monochromatic, comprising the following steps:
    a. directing a polarized light beam $I_L$ at right angles against the plane of the fibre product;
    b. detecting the intensity of the light reflected by the fibre product in two planes K and P at right angles to each other and at right angles to the plane of the fibre product;
    c. forming from the intensities of the reflected light two quantities I and R, whereof I has been obtained by directing the reflected light to pass through a polarizer, the plane of polarization of which is parallel with the plane of polarization of the light beam $I_L$, and R has been obtained by directing the reflected light to pass through a polarizer, the plane of polarization of which is perpendicular to the plane of polarization of the light beam $I_L$;
    d. forming the differences $I_K - R_K$ and $I_P - R_P$ of the quantities I and R observed in both planes K and P and using the ratio and/or difference of said differences as an index value for the anisotropy of the fibre orientation in the fibre product.

2. Method according to claim 1, wherein the intensity of light reflected by the fibre product is detected at an agnle ($\alpha$) substantially equalling 45°.

3. Method according to claim 1, wherein a single polarizer, the plane of polarization of which can be turned through 90° serves as the two polarizers which pass the intensity quantities I and R respectively.

4. Method according to claim 1, wherein the planes (K and P) in which the reflected light is observed have been chosen so as to obtain maximum reflection in one plane and minimum reflection in the other.

5. Method according to claim 1, wherein by means of a beam divider the light reflected by the paper in each of said planes is divided into two components having substantially equal intensities, whereof one is directed into a polarizer having a plane of polarization parallel to that of the light beam ($I_L$) and the other components is directed through a polarizer having a plane of polarization perpendicular to that of the light beam ($I_L$) and the beam components thus obtained (I and R) are directed to detectors, the differences ($e_{K1} = i_{K1} - r_{K1}$, $e_{P1} = i_{P1} - r_{P1}$ etc.) of the electrical quantities obtained from these detectors being formed and the ratio and/or difference of these differences ($e_{K1}$ and $e_{P1}$ etc.) being used, upon its indication by an indicator, as an index value for the anisotropy of the fibre orientation of the object of measurement.

6. Method according to claim 5, wherein the intensity of the light reflected by the paper is observed in both planes (K and P) on either side of the light beam ($I_L$) under the same angle ($\alpha$) with reference to the plane of the paper and the ratio and/or difference of the means of the differences derived from the intensities thus observed ($e_{K1}$ and $e_{K2}$) and of the differences ($e_{P1}$ and $e_{P2}$) is used as an index value for the anisotropy of the fibre orientation of the object of measurement.

7. Method according to claim 6 in application for the "on line" measurement of fibre orientation in a paper machine, wherein the planes (K and P) in which the reflected light is observed are planes at right angles to the paper web, one of them (K) being parallel to the direction of travel of the paper web and the other (P) perpendicular to the direction of travel of the paper web.

* * * * *

UNITED STATES PATENT OFFICE
CERTIFICATE OF CORRECTION

Patent No. 3,807,868             Dated April 30, 1974

Inventor(s) Pauli Simila

It is certified that error appears in the above-identified patent and that said Letters Patent are hereby corrected as shown below:

On the cover sheet insert -- [30] Foreign Application Priority Data    Finland    831/71    March 23, 1971 --.

Signed and sealed this 3rd day of December 1974.

(SEAL)
Attest:

McCOY M. GIBSON JR.          C. MARSHALL DANN
Attesting Officer            Commissioner of Patents